Jan. 31, 1961  D. J. ZOLL  2,970,261
SIGNAL ANALYZER
Filed Feb. 9, 1959  2 Sheets-Sheet 1
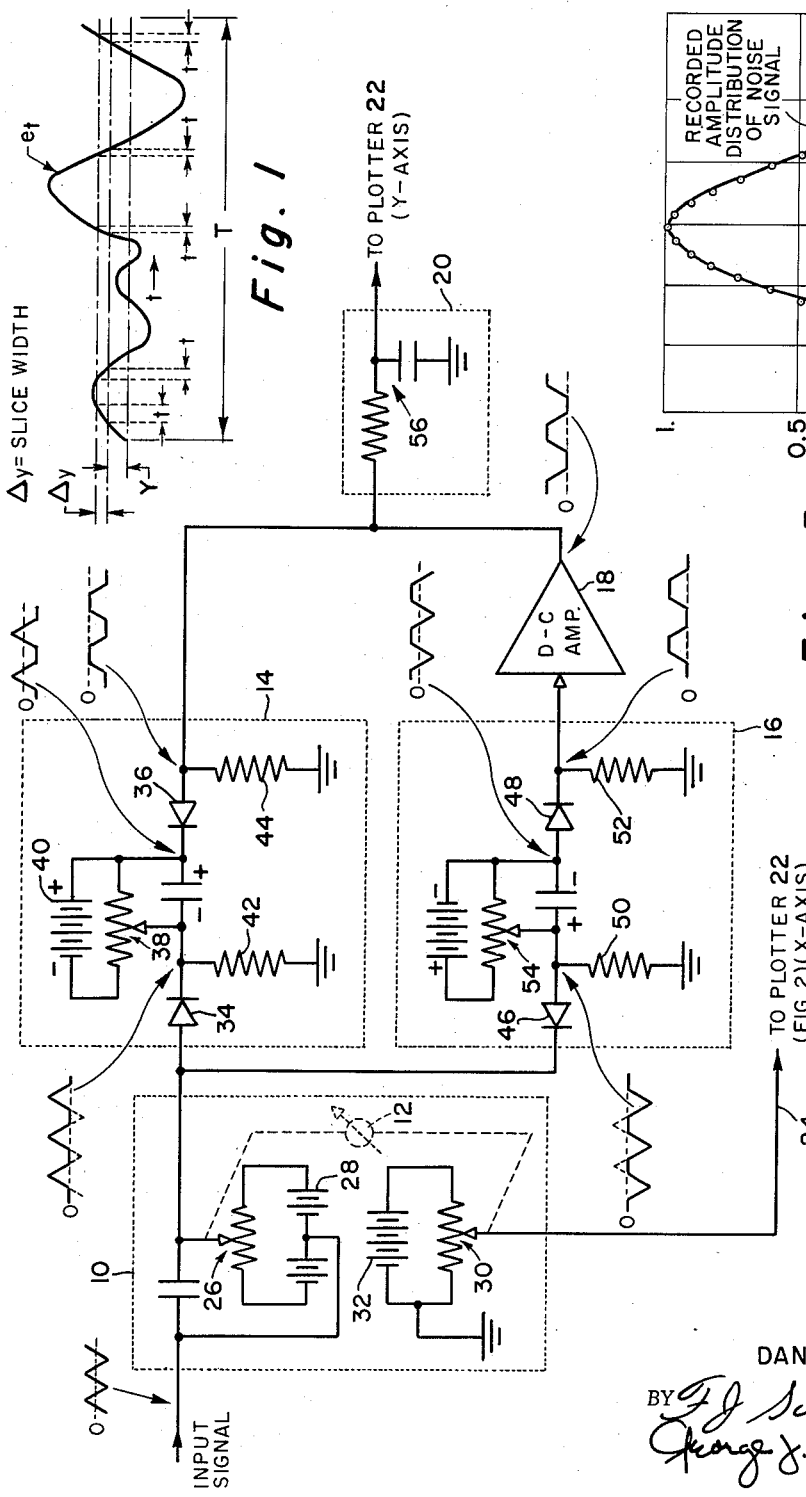
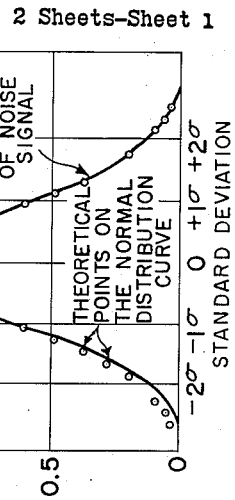
INVENTOR.
DANIEL J. ZOLL
ATTORNEYS Jan. 31, 1961         D. J. ZOLL              2,970,261
                    SIGNAL ANALYZER
Filed Feb. 9, 1959                         2 Sheets-Sheet 2
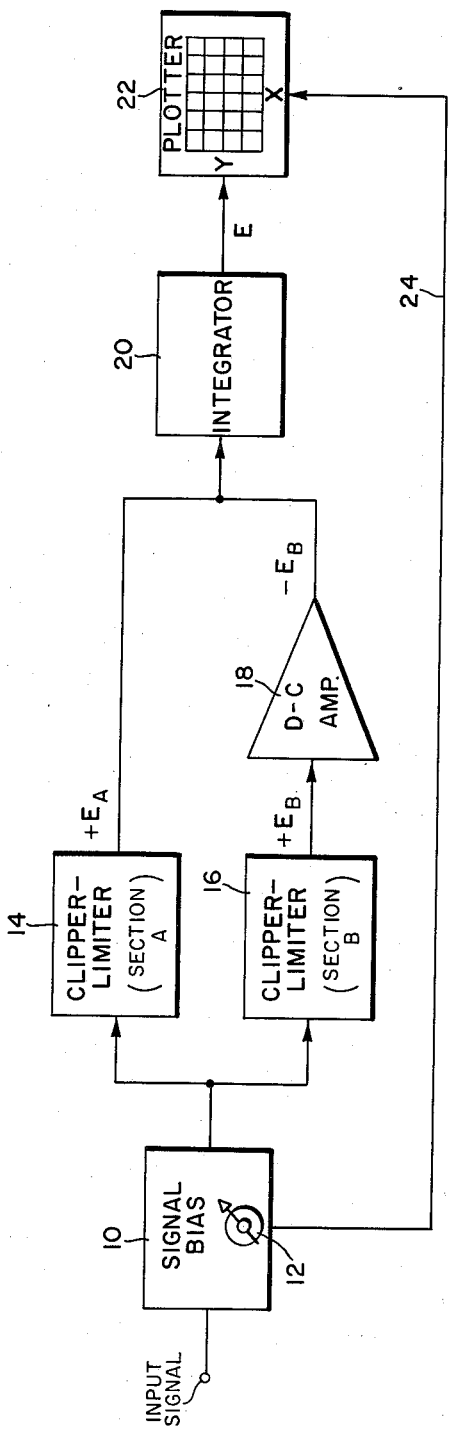
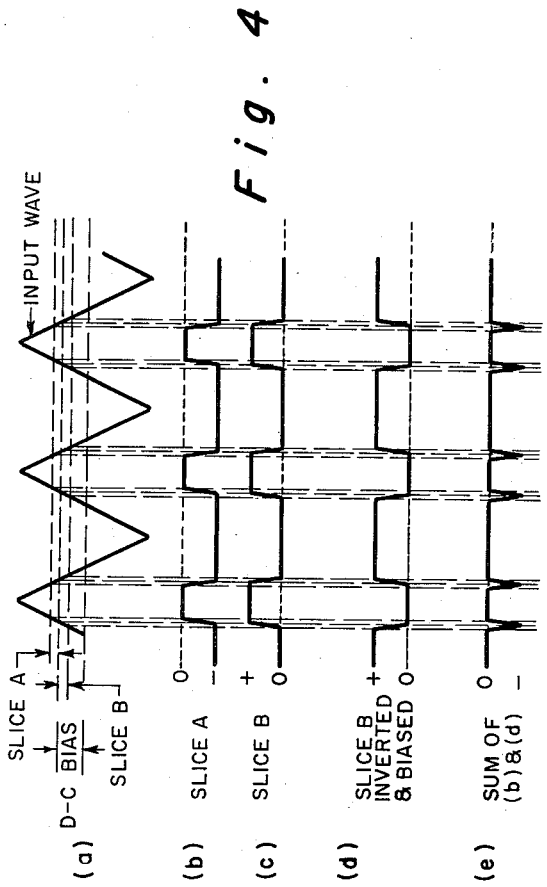
INVENTOR.
DANIEL J. ZOLL
BY
ATTORNEYS

United States Patent Office 2,970,261
Patented Jan. 31, 1961

2,970,261

SIGNAL ANALYZER

Daniel J. Zoll, 1215 S. N St., Oxnard, Calif.

Filed Feb. 9, 1959, Ser. No. 792,233

8 Claims. (Cl. 324—76)

(Granted under Title 35, U.S. Code (1952), sec. 266)

The invention described herein may be manufactured and used by or for the Government of the United States of America for governmental purposes without the payment of any royalties thereon or therefor.

The present invention relates in general to the analysis of any form of noise or vibration that is capable of being represented by an electrical signal which varies between predetermined frequency limits. In a preferred embodiment, the invention relates to apparatus for determining the amplitude-distribution density of noise signals in the audio-frequency range—that is, up to several thousand cycles per second.

The amplitude-distribution density of a voltage variation represents the relative probability of existence of different instantaneous signal levels. The method most widely employed for its determination involves a slow and costly data-reduction process, wherein the waveform is recorded on either paper or film and then the amplitude of the wave measured and tabulated at regular intervals of time. The results, when numerically reduced, yield a histogram illustrative of the amplitude-distribution density of the signal.

In addition to laborious hand-plotting methods, a storage tube may be utilized, with the signal being impressed upon a single line of the storage area. A linear sweep then reads off the accumulated densities. Alternatively, an oscilloscope display may be scanned by a photoelectric pickup. A still further expedient makes use of a train of sampling pulses occurring at a constant repetition frequency, such pulses being linearly modulated by the signal waveform. These sampling pulses are fed to a level selector which produces an output pulse each time the amplitude of one of the samples falls within a predetermined amplitude region. An electronic counter registers the number of selected pulses, and a second counter registers the total number of samples. The ratio of these two counts represents the distribution density at the selected level.

It is also known that information similar to that obtained by use of the above-described techniques can be derived by scanning the signal between its amplitude limits with an integrating detector that has a response proportional to the total time that a given amplitude band, or "slice," is occupied by the signal. The narrower this "slice" the more accurate are the results achieved. Heretofore this required a circuit of considerable complexity, a motor-driven scanning potentiometer being necessary to "swing" the amplitude slice or aperture over the full range of the input signal. In addition, difficulty was experienced in securing a sufficiently long measurement time at any given amplitude level, such measurement time being limited in duration by the averaging period of the output integrator.

The present invention is based upon the principle that the signal to be analyzed, after being biased, can be amplitude-gated by two clipper-limiters each of which samples the signal between the bias level and one-half the width of the slice or sample being inspected. One clipper-limiter acts in a positive direction and the other in a negative sense, each producing a square wave output. The negative square wave is inverted and the two waves summed to yield a voltage variation which is plotted by an X—Y recorder to display the desired amplitude-distribution characteristic.

One object of the invention, therefore, is to provide for the analysis of any form of noise or vibration that is capable of being represented by a varying electrical potential.

Another object of the invention is to provide means for determining the amplitude-distribution density of an input wave.

A further object of the invention is to provide a simple and rapid automatic plotter of the amplitude-distribution characteristics of noise signals in the audio-frequency range.

Other objects and many of the attendant advantages of this invention will be readily appreciated as the same becomes better understood by reference to the following detailed description when considered in connection with the accompanying drawings wherein:

Fig. 1 is a waveform of a typical input signal to be analyzed by the apparatus of the present invention, and showing in addition those portions of the wave which are "sampled" at a particular amplitude level;

Fig. 2 is a block diagram of a preferred form of amplitude-distribution analyzer to which the input signal of Fig. 1 may be applied;

Fig. 3 is a schematic circuit diagram of the amplitude-distribution analyzer of Fig. 2;

Fig. 4 is a set of waveforms illustrating certain operating features of the circuit of Fig. 3; and Fig. 5 is a curve depicting the degree of accuracy to be expected from a circuit constructed in accordance with the principles of the present invention.

Referring first to Fig. 1, a voltage variation is illustrated having the wave form $e_t$. As a function of time, the amplitude-distribution density of signal $e_t$ is the relative probability that the signal amplitude lies within an interval of amplitude $\Delta y$, such interval $\Delta y$ extending between the level Y and the level $Y+\Delta y$. The amplitude-distribution density plot is the ratio of $\Sigma t$, the time the wave spends between Y and $Y+\Delta y$, to T, the total time of measurement at level Y. This relationship can be expressed as $$\int_{Y}^{Y+\Delta y} P(e_t)de_t = \frac{\Sigma t}{T} \qquad (1)$$

where $P(e_t)$ is the probability distribution of the wave $e_t$; $t$ is the time the wave $e_t$ lies between Y and $Y+\Delta y$; and T is the total time that the interval $\Delta y$ is positioned at Y. Amplitude-distribution analysis according to the present invention yields an output voltage E that is proportional to $$\frac{\Sigma t}{T}$$

as these quantities are represented in Fig. 1. Therefore, from Equation 1

$$E = k\frac{\Sigma t}{T} = k\int_{y}^{y+\Delta y} P(e_t)de_t \qquad (2)$$

Fig. 2 is a block diagram of a preferred circuit for carrying out the analyzing function of the present invention. It includes a biasing network 10 to which a signal wave such as shown in Fig. 1 is applied. The amount of bias applied by network 10 is intended to be varied through manual actuation of the control knob 12. As this bias varies, different amplitude levels of the input wave are sampled by two clipper-limiters 14 and 16.

It will be recalled that the analyzer herein disclosed effectively inspects only a small amplitude level, or "slice,"

of the input wave (Δy in Fig. 1). Consequently, the amount of bias determines the particular amplitude level that is inspected or sampled, the sampling function, as stated, being performed by the clipper-limiters 14 and 16. One of these units samples one portion of this "slice" (with reference to the bias level set by network 10) and the other samples remaining "slice" portion. The overall width of the "slice" is controllable in a manner to be set forth in connection with a description of the circuit of Fig. 3. The voltage output from the "slice," however, always represents its average value $\bar{E}$.

The clipper-limiters (or "slicers") 14 and 16 maintain a narrow interval between the clipping and limiting levels which define the boundaries of each slice portion, as will subsequently be brought out in a discussion of Fig. 4. One clipper-limiter 14 (which may be designated as Section A) samples the D.-C. biased input signal ($e_t$+bias) between zero (the bias level) and plus one-half the slice width. Since the slice width is quite narrow, the output of this section A is essentially a negative square wave with an amplitude equal to minus one-half the slice width. It has an average value of $+\bar{E}_A$.

Similarly, the other clipper-limiter 16 (section B) inspects the biased input signal between zero and minus one-half the slice width. The output of Section B is inverted and biased to plus one-half the slice width by a D.-C. amplifier 18, so that essentially a positive square wave results. The average value of this wave is $-\bar{E}_B$.

The outputs of clipper-limiters 14 and 16 are combined and applied to an integrating network 20 which averages the combined voltage. The latter, E, is then represented on the Y-axis of a plotting board, or X—Y recorder, 22, the X-axis of which represents the instantaneous value of signal bias as conducted thereto from network 10 over conductor 24.

With $\bar{E}$ being thus plotted as a function of bias voltage, a close approximation to the probability distribution of $e_t$ (that is, $P(e_t)$ in Equation 1) is obtained. The approximation approaches equality as the slice width approaches zero, or, in other words, as the resolution of the apparatus becomes infinite.

Fig. 3 illustrates preferred circuit arrangements for performing the respective functions of the biasing network, integrator, and clipper-limiters of Fig. 2. For example, the signal biasing unit 10 may incorporate a potentiometer 26 the resistance element of which is connected across a source of potential 28. The input signal has D.-C. bias added thereto by means of a connection to the adjustable wiper element of potentiometer 26, as shown, the amount of this bias being controllable by the operator through manipulation of control knob 12 (Fig. 2).

Since the output of integrator 20 is to be plotted as a function of bias voltage, a second potentiometer 30 is connected across a further source of potential 32. The wiper elements of potentiometers 26 and 30 are ganged together for concurrent actuation by knob 12, as indicated in Fig. 3, the voltage output of potentiometer 30 being applied to the X-axis of plotter 22 over the conductor 24. Purely as an example, the potentiometers 26 and 30 may each have a resistance value of 20,000 ohms. with the potential sources 28 and 32 being rated at 90 volts and 6 volts, respectively.

The function of each of the clipper-limiters 14 and 16 is to cut off the terminal portion of the applied signal in each of its directions of polarity, leaving only a narrow band or slice between the selected clipping and limiting levels. This is accomplished by including in each clipper-limiter a pair of unidirectional circuit components (such as silicon diodes) connected with reverse polarities, the unit 14 having the diodes 34 and 36 so arranged as to eliminate from the input wave the respective terminal negative and positive portions thereof, as indicated by the accompanying waveforms. The width of the remaining wave portion is determined by adjustment of a slice-level potentiometer 38 which is connected across the voltage source 40. The biased input wave, after limiting by diode 34, appears across resistor 42, while the same wave after further clipping by diode 36 appears across resistor 44. Each of these resistors may be in the order of 10,000 ohms, while the potentiometer 38 and potential source 40 may have values of 10,000 ohms and 3 volts, respectively.

The diodes 46 and 48 of the clipper-limiter 16 are reversed with respect to the corresponding elements of clipper-limiter 14. Thus the input wave is initially cut-off in a different direction of polarity from its D.-C. axis by the diode 46 to appear across resistor 50 in the form illustrated. It is further acted upon by diode 48 to appear both clipped and limited across resistor 52 in a form similar to that of the wave resulting from the action of network 14, but with the difference that the latter network in effect "samples" the applied wave between zero and the positive half of the slice width, while the network 16 "samples" such wave between zero and the negative half of the slice width. As in the case of network 14, the setting of a potentiometer 54 determines the width of slice B.

The above action is made clear by the waveforms of Fig. 4, wherein an input wave is depicted at (a) as having a D.-C. bias applied thereto, with two "slices" A and B extending in different polarity directions from the bias level. These slices A and B are respectively acted upon by the clipper-limiters 14 and 16 to yield the waves of Figs. 4(b) and (c), respectively, in the manner above described, the amplitude of the waves being exaggerated in the drawing for the sake of clarity of illustration.

In order to properly combine the "slice" portions A and B, it is necessary to invert and bias the output of clipper-limiter 16 to plus one-half the slice width by means of the D.-C. amplifier 18, as shown in waveform (d) of Fig. 4. This follows because it is desired to obtain the average of the combined wave $\bar{E}$, and $$\bar{E} = \bar{E}_B + (-\bar{E}_A)$$
$$= \int_0^{\text{D.-C. level}-\frac{1}{2}\text{ slice}} P(e_t)de_t - \int_0^{\text{D.-C. level}+\frac{1}{2}\text{ slice}} P(e_t)de_t$$

therefore, $$\bar{E} = -\int_{\text{D.-C. level}-\frac{1}{2}\text{ slice}}^{\text{D.-C. level}+\frac{1}{2}\text{ slice}} P(e_t)de_t$$

The combined wave $\bar{E}$ (Fig. 4(e)) is integrated or averaged by the R-C network 56 to yield the voltage variation which is applied directly to the Y-axis of plotter 22 (Fig. 2). The time constant of this R-C network should be such as to smooth the impulses of the wave shown in Fig. 4(e), a resistor of 1 megohm and a capacitor of 10 microfarads being satisfactory in the example given.

It will be noted that the disclosed analyzer has only three operating controls in addition to an X-axis scale factor adjustment (not shown) for the plotter 22. These are the control knob 12 (which actuates the two ganged bias potentiometers 26, 30) and the two slice level potentiometers 38 and 54.

The first step in the operation of the analyzer is to ensure that the D.-C. amplifier 18 is properly balanced. The two slice-level potentiometers 38 and 54 are then adjusted until both clipper-limiter sections A and B are producing a slice of the same width or magnitude. Assuming that proper scales have been selected on the X—Y recorder or plotting board 22, the biasing potentiometer control knob 12 is slowly actuated by hand to scan, or sweep over, the input signal, recording on plotter 22 the amplitude-distribution density information desired.

Since the potential of the biasing source 28 has been assumed to be 90 volts, the peak-to-peak value of the input signals to the circuit illustrated should not exceed this level. However, the signal strength should closely approximate this figure in order to obtain maximum resolution. The bias voltage sources are selected, of course, in accordance with the characteristics of the signals to be analyzed.

Fig. 5 indicates the high degree of accuracy with which the disclosed system operates. It shows both the plotted and theoretical distribution density of a random noise signal. Generally speaking, an error of not more than five percent can be expected within the frequency limits of the circuitry, although this can be reduced to less than two percent without excessively complicating the design.

The preceding discussion has assumed that the input wave is of constant slope within the "slice" inspected by the clipper-limiters. Resolution, or the ability of the analyzer to define the structure of the true amplitude-distribution of the input waveform, is directly related to slice width, which, as previously stated, must approach zero if E is to be exactly proportional to $P(e_t)$. However, it must be recognized that drift of the D.-C. amplifier 18 causes an error that is inversely proportional to the amplitude of the output signal, and, consequently, the latter should be as large as possible to minimize such error. But, since the analyzer output signal E is proportional in magnitude to the slice width, it will be seen that these two factors of amplifier drift error and resolution error are mutually incompatible and must be balanced one against the other to obtain the best working compromise.

The ratio of slice width to peak-to-peak signal amplitude is defined as the resolution ratio. Normally, amplifier drift limits this ratio to 1:20. However, if a stabilized D.-C. amplifier is used, the drift error becomes negligible and the resolution ratio may reach 1:100.

The response characteristics of the silicon diodes should also be taken into consideration, since this may be non-linear, especially at high frequencies. In the audio range, however, errors introduced by these components can generally be disregarded.

Obviously many modifications and variations of the present invention are possible in the light of the above teachings. It is therefore to be understood that within the scope of the appended claims the invention may be practiced otherwise than as specifically described.

I claim:

1. An amplitude-distribution analyzer for determining the percentage of time that a randomly-varying signal spends at a particular amplitude level, said analyzer comprising means for biasing said signal, a pair of clipper-limiters, one of said clipper-limiters acting in effect to sample said signal in one direction of polarity from the level set by said biasing means, the other of said clipper-limiters acting in effect to sample said signal in the remaining direction of polarity from such bias level, means for inverting the polarity of the signal output of one only of said clipper-limiters, means for combining the output of said inverting means with the output of the remaining clipper-limiter, means for integrating the energy so combined, and an indicator on which the integrated energy is displayed as a function of the output of said biasing means.

2. An amplitude-distribution analyzer according to claim 1, in which said biasing means is manually controllable to permit a sampling of said randomly-varying signal at different predetermined amplitude levels.

3. A circuit for recording the amplitude-distribution density of an input wave, said circuit including means for applying a D.-C. bias voltage to said wave, means for gating said wave so as to pass only that portion thereof lying between predetermined amplitude levels extending equidistantly in different directions of polarity from said bias voltage, a network for averaging the output of said gating means, and a display device on which the output of said averaging network is recorded.

4. A circuit according to claim 3, in which said display device comprises an X—Y recorder to the respective axes of which are applied a voltage which is a function of said bias voltage and the output of said averaging network.

5. A circuit according to claim 3, in which said wave-gating means includes a pair of clipper-limiters each of which includes two unidirectional circuit components arranged serially in opposing directions of polarity both with respect to one another and to the corresponding components of the remaining clipper-limiter.

6. The combination of claim 5, in which the said unidirectional circuit components are silicon diodes.

7. In a device of the class described, a source of input signals the amplitude of which varies in a random manner, a two-axis recording device, a manually-controllable biasing network having two outputs, one of such outputs being applied to one axis of said recording device and the other of such outputs being applied to bias the input signals from said source, a pair of clipper-limiters each receiving the signals so biased, one of said clipper-limiters being effective to pass only that portion of the biased signals which extends from the bias level to a cut-off level lying in one polarity direction from such bias level, the other of said clipper-limiters being effective to pass only that portion of the biased signals which extends from the bias level to a cut-off level lying in the other polarity direction from such bias level, means for inverting the polarity of the output of one of said pair of clipper-limiters, means for combining the output of said inverting means with the output of the remaining clipper-limiter, means for integrating the combined signal, and means for applying the output of said integrating means to the remaining axis of said recording device.

8. A device according to claim 7, further including manually-adjustable means forming part of each clipper-limiter for varying the extent of separation between the bias level and the said cut-off level, thus effectively determining the amplitude range of the biased signals which is passed thereby.

References Cited in the file of this patent

UNITED STATES PATENTS

| | | |
|---|---|---|
| 2,497,693 | Shea | Feb. 14, 1950 |
| 2,774,535 | Anderson | Dec. 18, 1956 |
| 2,779,869 | Gerks | Jan. 29, 1957 |
| 2,849,183 | Kuck | Aug. 26, 1958 |
| 2,903,185 | Myers | Sept. 8, 1959 |